March 31, 1936.  L. B. HILL  2,035,961
CAMERA
Filed Aug. 18, 1934  2 Sheets-Sheet 1
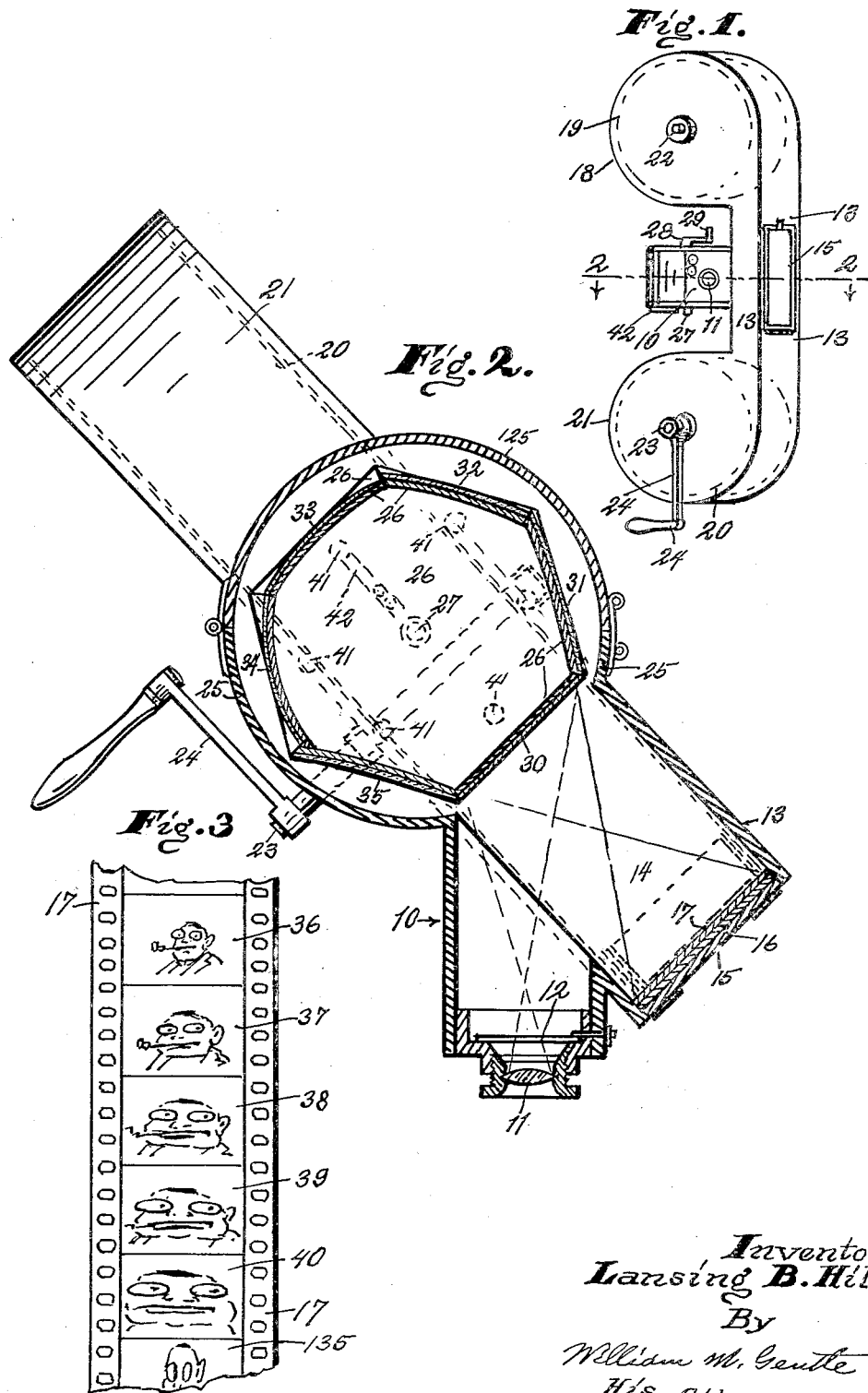

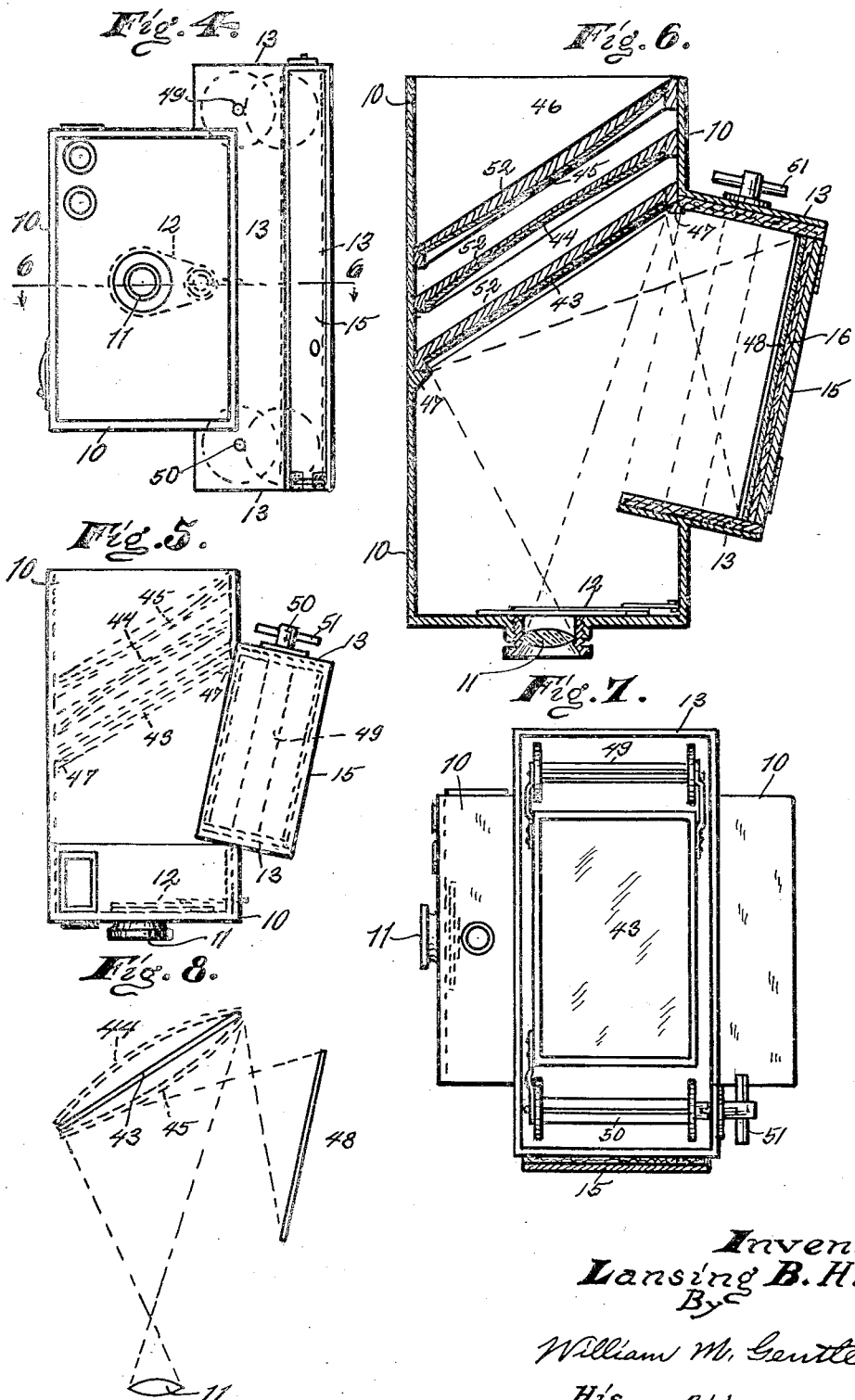

Patented Mar. 31, 1936

2,035,961

UNITED STATES PATENT OFFICE 2,035,961

CAMERA

Lansing B. Hill, Santa Ana, Calif.

Application August 18, 1934, Serial No. 740,471

2 Claims. (Cl. 88—16)

This invention relates to an improvement in the construction and operation of a motion picture camera, and the principal object is to provide means whereby photography can be utilized to take moving pictures, photographs and the like in the usual way and simultaneously distort them as they are reflected to a film, negative or the like, so that the images when projected or printed will be highly grotesque and humorous.

In other words by means of my improved motion picture camera I can easily and quickly transform an ordinary episode that is devoid of any pronounced humorous features into an exceedingly interesting humorous moving picture. That is, my camera is provided with a series of mirrors or reflecting means that range in form from a plain, straight-faced mirror to both concave and convex mirrors arranged to receive an image from a lens in the usual way and then transfer the image to a moving picture film, negative or the like where it will appear distorted, more or less, and also reversed as to its appearance.

By the foregoing means the right-handed actors of an episode will all appear as left-handed and vice versa, and by means of the curved mirrors they will or can be made to appear tall, thin, short and fat, and gradually changing from one figure to the other by a gradual changing of the mirrors as the moving pictures are taken.

A feature of invention is shown in providing means for first projecting an image from a lens and then reflecting it to a moving picture film or negative and changing to variously curved mirrors to vary the form and appearance of the image to thereby obtain humorous effects.

Another object of this invention is to provide a simple means for reversing the image on a negative or film so that in commercial use the negative need not be stripped or turned when being transferred or printed on a metal plate ready for etching; and when so used I provide my camera with a plain straight-faced mirror for reflecting the image from the lens to the film, thereby saving both time and labor.

Another feature of invention is shown in providing means for utilizing variously curved mirrors to vary the appearance of an image in moving pictures.

Other objects, advantages and features of invention may appear from the accompanying drawings and detailed description thereof.

The accompanying drawings, which are principally semi-diagrammatic, illustrate this invention, in which:

Figure 1 is a front elevation of a motion picture camera constructed in accordance with this invention.

Fig. 2 is an enlarged central section on line 2—2 of Fig. 1, showing a turntable carrying a plurality of mirrors, any one of which can be turned into position to reflect an image from a lens to a moving picture film.

Fig. 3 is a fragmental front view of a moving picture film semidiagrammatically showing the top picture as reflected from a plain straight-faced mirror and the pictures below it distorted by curved mirrors and reflected to the film illustrating how the camera can be used to produce comic moving pictures.

Fig. 4 is a front view of a slightly modified form of camera, with the shutter back of the lens illustrated diagrammatically.

Fig. 5 is a plan view of the camera shown in Fig. 4.

Fig. 6 is an enlarged section on the line 6—6 of Fig. 4 showing the camera provided with three mirrors that are interchangeable and which slide into place so they reflect an image from the lens to the negative or film.

Fig. 7 is a side view of the camera with the side door open to show the removable spools on which the film is supported in position to receive an image by reflection from one of the mirrors shown in Fig. 6.

Fig. 8 is a diagrammatic view of the lens, film and mirrors shown in Fig. 6.

The motion picture camera shown in Figs. 1 to 3 inclusive includes a casing 10 with a front end in which there is a lens 11 with the usual shutter mechanism 12, the latter being indicated diagrammatically as any type of shutter mechanism can be employed, it being understood that it is opened and closed as may be necessary to take either one or more pictures, especially moving pictures.

The casing 10 has a side extension 13 that is arranged at an angle of about forty-five degrees relative to a longitudinal plane through the camera, and this extension forms a film chamber 14. There is a door 15 to this chamber that has a felt lining 16 that forms a background for the moving picture film 17 that is arranged out of normal focus with the lens.

The extension 13 has its upper end extended into the form of a drum 18 in which there is an upper reel 19 on which the moving picture film 17 is wound with its lower end secured to a lower reel 20 in a drum 21 that is a continuation of the lower end of the extension 13.

The upper reel 18 is mounted on a shaft 22, and the lower reel 20 is mounted on a shaft 23 that is rotated by a crank 24 to move the motion picture film 17, from the upper to the lower reel, and in passing from reel to reel the film passes through the chamber 14 where it can receive by reflection the images of the objects on which the lens 11 may be focused.

The means for reflecting the images from the lens 11 to the film 17 includes a circular housing 25 that is integral with the casing 10. There is a drum 26 in the housing 25 that is pivotally mounted on upper and lower bearings 27 and 28, the latter being extended into a crank 29 whereby the drum 26 can be turned to move one mirror out of and another into focus with the lens 11, and when a mirror is in focus with the lens 11 it will reflect the images of the objects on which the lens is focused onto the moving picture film 17.

Preferably there are six mirrors on the drum, each arranged to be moved into focus with the lens 11.

The mirror 30 has a straight face and is designed to reflect the images from the lens 11 to the film in true or exact detail without deviation in any respect, and the other mirrors 31, 32, 33, 34, and 35 are intentionally curved and in graduated curvatures with the purpose of distorting the images from the lens 11 before reflecting them to the film 17, and by the foregoing means images can be humorously distorted, it being understood that the table 26 is turned in synchrony with the movement of the film. That is, when an image is to be distorted the mirrors are turned in time with the exposure of the film. This feature is semi-diagrammatically illustrated in Fig. 3, in which it is assumed that the picture 36 was reflected by mirror 30, after which the film 17 was moved to position to receive another exposure, and the drum was actuated to move the mirror 30 out of focus and also move the slightly curved convex mirror 31 into focus with the lens 11 on which exposure the picture 37 is shown as slightly distorted.

Another like movement of the film and drum brings the convex mirror 32 into position to reflect a greater distorted image to the film, as shown by picture 38.

It is obvious that as the convex mirrors 33 and 34 are moved into focus with the lens the image will continue to be distorted as illustrated by the pictures 39 and 40, and the concave mirror 35 will reversely distort the image as shown in picture 135.

As diagrammatically shown in Figs. 1 and 2, the drum is provided with stops 41 on its lower end that are engaged by a spring 42 to hold the mirrors in the right position for reflecting images from the lens to the film.

From the foregoing it can be readily seen that an image from the lens 11 can be progressively and humorously distorted by rotating the drum 26 to change the mirror for reflecting the image to the film. A whole episode that is ordinary in character and devoid of pronounced humor can thus be photographed and distorted into an exceedingly humorous moving picture.

In Figs. 4 to 8 inclusive I show a camera in which the drum 26 is omitted, and instead I employ the interchangeable mirrors 43, 44 and 45 that are arranged to be slid into the chamber 46 until they engage the stop, 47, at which time they are in focus and in position to reflect images from the lens 11 to the film 48.

Preferably the film 48 is arranged on the upper detachable spool 49 and is extended down to a removable take-up spool 50, and the lower spool is turned by the pin 51, as best shown in Fig. 7, in which figure the side door of the camera is open to show the arrangement of the spools.

The removable sliding mirror 43 has a flat face so it reflects undistorted images from the lens 11 to the film 48. The mirror 44 is concave and mirror 45 is convex so they distort the images from the lens 11 as described.

It is assumed that the frames 52 of the mirrors 43, 44, and 45 are constructed so that when they engage the stop 47 the mirrors are in proper focus with the lens 11.

It is also assumed that this camera can be provided with the usual camera attachment, but in the drawings only such parts are shown as are necessary to illustrate the construction and operation of this camera.

In Fig. 8 the frames 52 are omitted and three sliding mirrors 43, 44, and 45 are grouped, it being understood that they are each in focus with the lens 11 and film 48 when in use.

The camera shown in Figs. 1 and 2 has the extension 25 provided with a suitable door 125 so the drum and its mirrors can be reached for cleaning, replacement of parts and repair.

In use the camera is operated as described, using both flat faced and curved mirrors, the former to simply reflect the image from the lens to the film so it is reversed, and the latter to distort the image and reflect it to the film in a reverse order.

I claim as my invention:

1. A motion picture camera including a casing, a lens therein, an offset extension to said casing arranged angularly thereto and having a film exposure chamber therein, a stationary drum on the upper end of said extension, an upper reel in said drum on which a motion picture film can be wound, another stationary drum on the lower end of said extension, a take-up reel therein to which an end of the film on said upper reel can be secured, a crank for rotating said take-up reel so the film on said upper reel will be moved down through said film exposure chamber onto said take-up reel, a circular extension to said casing arranged opposite said offset extension, a revolving drum therein, a plurality of curved mirrors on said drum arranged to be consecutively moved into focus with said lens so they will receive images from said lens and reflect them to the moving picture film, said mirrors curved so they will distort said images, and means for rotating said revolving drum.

2. A motion picture camera including a casing, a lens therein, an offset extension to said casing having a motion picture film therein arranged out of normal focus with said lens, another extension to said casing having a drum therein, a plurality of distorting mirrors arranged on said drum so they can be successively moved into focus with said lens to reflect images therefrom to the motion picture film, a crank for rotating said drum, stops on the lower ends of said drum, and a spring for engaging said stops to hold said mirrors as they are successively moved into focus with said lens.

LANSING B. HILL.